United States Patent
Bian et al.

(10) Patent No.: US 7,050,631 B2
(45) Date of Patent: May 23, 2006

(54) BARCODE DETECTION SYSTEM

(75) Inventors: Long Xiang Bian, Sharon, MA (US); Walter P. Sweeney, Jr., Stoughton, MA (US)

(73) Assignee: SICK Auto Ident, Inc., Stoughton, MA (US)

( * ) Notice: Subject to any disclaimer, the term of this patent is extended or adjusted under 35 U.S.C. 154(b) by 745 days.

(21) Appl. No.: 10/283,781

(22) Filed: Oct. 30, 2002

(65) Prior Publication Data

US 2004/0086182 A1 May 6, 2004

(51) Int. Cl.
*G06K 9/18* (2006.01)

(52) U.S. Cl. ............ 382/183; 235/462.08; 382/296

(58) Field of Classification Search .......... 235/462.08, 235/462.09
See application file for complete search history.

(56) References Cited

U.S. PATENT DOCUMENTS

| 5,487,115 A | * | 1/1996 | Surka .................. 382/296 |
| 5,545,887 A | * | 8/1996 | Smith et al. ........... 235/462.08 |
| 5,550,365 A | * | 8/1996 | Klancnik et al. ...... 235/462.25 |
| 5,969,325 A | | 10/1999 | Hecht et al. |
| 6,070,800 A | | 6/2000 | Fujita et al. |
| 6,386,454 B1 | * | 5/2002 | Hecht et al. ........... 235/462.16 |
| 6,834,806 B1 | * | 12/2004 | Benedetti ............... 235/462.25 |

FOREIGN PATENT DOCUMENTS

EP 0 887 760 A2 12/1998

* cited by examiner

*Primary Examiner*—Joseph Mancuso
*Assistant Examiner*—Damon M Conover
(74) *Attorney, Agent, or Firm*—Iandiorio & Teska

(57) ABSTRACT

A barcode detection device is disclosed which captures an image; examines the image in a plurality of grids; obtains a profile of the image along the sides of the grids; determines the number of transitions in the profile of each side; compares the number of transitions in each adjacent pair of sides with the number of transitions in the opposing adjacent pair of sides, respectively, and identifies a potential barcode data bearing grid when the count of transitions on one pair of adjacent sides matches the count of transitions on the opposing pair of adjacent sides.

29 Claims, 13 Drawing Sheets

FIG. 6

BARCODE DETECTION SYSTEM

FIELD OF THE INVENTION

This invention relates to a method and system for barcode detection including barcode position and orientation.

BACKGROUND OF THE INVENTION

A barcode is a machine readable symbol made up of parallel solid lines of bars and spaces of varying width. The bars and spaces form alternate light and dark areas representing a digital code that contains the information represented by the barcode symbol. The digital code is translated to alpha numeric characters which may represent information about the item bearing the barcode label such as price, date, manufacturer and other information. Barcodes are typically read by scanning with a small spot of light. The reflected light is sensed by a photosensitive element as the spot sweeps across the barcode surface. The change in reflectance caused by the black and white bars and spaces varies the intensity of the reflected light which serves as a representation of the barcode symbol. In one type of barcode reader a two-dimensional image containing the barcode is captured and stored in the general purpose computer memory where pairs of parallel scan lines are then processed to determine the location and orientation of the barcode. This approach to locating the barcode requires computing the point by point product of the derivatives of the two parallel scan lines. The image is scanned in each of four directions, horizontal, vertical, rising diagonal and falling diagonal in order to locate and coarsely orient the barcode. Further fine orientation of the barcode is accomplished by cross correlating the parallel scan lines in pairs. This approach uses an application specific integrated circuit (ASIC) to determine the location and coarse orientation of a barcode and subsequent digital signal processing to more finely orient, filter, and scan the coarsely located barcode. One of the shortcomings of this approach is that most of the data captured by the camera in such a case is a useless image of the conveyor and the non-barcode bearing areas of the parcels moving along the conveyor: only a small percentage of the image data includes the barcodes. In another approach, the barcode reader requires and ASIC and one or more field programmable gate arrays (FPGAs) to obtain a pixelized image and then compare the intensity of pixels in a current row to that of pixels in previous rows in different relationships to the current row to obtain detection values that are compared to a threshold value to determine whether the information being viewed is potentially part of a barcode. This approach, like the earlier one, employs significant hardware and requires a substantial amount of time to accumulate and operate on the data.

BRIEF SUMMARY OF THE INVENTION

It is therefore an object of this invention to provide an improved method and system for barcode detection including location and orientation.

It is a further object of this invention to provide such an improved method and system for barcode detection which is faster and uses less hardware.

It is a further object of this invention to provide such an improved method and system for barcode detection which more definitively and accurately determines the location and orientation of a barcode.

It is a further object of this invention to provide such an improved method and system for barcode detection which reduces and compresses the data on which it must operate.

The invention results from the realization that detection of a barcode in an image including location and/or orientation can be effected more quickly and effectively with less hardware by examining the image in a plurality of grids, obtaining a profile of the image along the edge of the grid, determining the number of transitions on the profile of each side, and comparing the number of transitions on each adjacent pair of sides with the number of transitions on the opposing adjacent pair of sides, and identifying a potential barcode data bearing grid when the count of transitions on one pair of adjacent sides matches the count of transitions on the opposing one and the further realization that by obtaining a profile of the image in a circular pattern in a lesser, sub-grid, dividing the circular pattern into a number of pairs of opposing semi-circular patterns and comparing the semi-circular pattern of profiles, the orientation of the barcode data bearing grid can be ascertained as a function of the orientation of the best match pair of semi-circular profile patterns.

This invention features a method of detecting a barcode in an image including capturing an image; examining an image in a plurality of four sided grids; and obtaining a profile of the image along each side of a grid. The number of transitions in the profile of each side is determined and a comparison is made to the number of transitions in each adjacent pair of sides with the number of transitions on the opposing adjacent pair of sides. A potential barcode data bearing grid is identified when the count of transitions on one pair of adjacent sides matches the count of transitions on the opposing pair of adjacent sides.

In a preferred embodiment the method may further include obtaining a profile of the image in a circular pattern within a barcode data bearing guide and dividing the profile of the circular pattern into a number of pairs of opposing semi-circular patterns, comparing with each other the profiles of semi-circular patterns to each of the pairs of opposing semi-circular patterns, and defining the orientation of the barcode data bearing grid as a function of the orientation of the pair of profiles of semi-circular patterns which have the best match. The method may also include obtaining a profile of the image along the orientation of the barcode data borne by the barcode data bearing grid to determine the location of bars and spaces and scanning along at least one of the bars and spaces of the barcode data to verify the orientation and confirm that the barcode data bearing grid is a portion of a bona fide barcode. The method may also include combining into a group contiguous grids having a defined orientation, examining each neighboring grid to each of the combined contiguous grids to determine its orientation and adding the neighboring grid to the group if it has the defined orientation. The transition counts may match when the counts are approximately equal or when they are equal. The profile of the image and circular pattern may be a gray scale profile. Comparing with each other the profiles of the circular pattern may include differencing the gray scale values of each pair of opposing semi-circular patterns. The scanning may include scanning along at least one of the bars and spaces of the barcode data. The profile of the image and the circular pattern may be obtained in the section of the grid which has the highest transition count.

This invention also features a method of detecting a barcode in an image including capturing an image, examining the image in a plurality of four sided grids, obtaining a profile of the image along each side of a grid, and determining the number of transitions in the profile of each side. The number of transitions in each adjacent pair of sides is compared with the number of transitions in the opposing adjacent pair of sides, respectively. A grid is determined to be a potential barcode data bearing grid when the count of transitions on one pair of adjacent sides matches the count of transitions on the opposing pair of adjacent sides. The method also includes obtaining a profile of the image in a circular pattern within a barcode data bearing grid, dividing said profile of a circular pattern into a number of pairs of opposing semi-circular patterns, comparing with each other the profiles in semi-circular patterns to each of said pairs of opposing semi-circular patterns, and defining the orientation of the barcode data bearing grid as a function of the orientation of the pair of profiles in semi-circular patterns which have the best match.

This invention also features a method of detecting a barcode in an image including capturing an image, examining the image in a plurality of four sided grids, obtaining a profile of the image along each side of a grid, determining the number of transitions in the profile of each side, and comparing the number of transitions in each adjacent pair of sides with the number of transitions in the opposing adjacent pair of sides, respectively. A potential barcode data bearing grid is identified when the count of transitions on one pair of adjacent sides matches the count of transitions on the opposing pair of adjacent sides. The method also includes obtaining a profile of the image in a circular pattern within a barcode data bearing grid, dividing said profile of a circular pattern into a number of pairs of opposing semi-circular patterns, comparing with each other the profiles of semi-circular patterns to each of said pairs of opposing semi-circular patterns, defining the orientation of the barcode data bearing grid as a function of the orientation of the pair of profiles of semi-circular patterns which have the best match, obtaining a profile of the image along the orientation of the barcode data borne by the barcode data bearing grid, and scanning along at least one of the bars and spaces of the barcode data to verify the orientation and confirm that the barcode data bearing grid is a portion of a bona fide barcode.

This invention also features a method of detecting a barcode in an image including capturing an image, examining the image in a plurality of four sided grids, obtaining a profile of the image along each side of a grid, determining the number of transitions in the profile of each side, comparing the number of transitions in each adjacent pair of sides with the number of transitions in the opposing adjacent pair of sides, respectively, and identifying a potential barcode data bearing grid when the count of transitions on one pair of adjacent sides matches the count of transitions on the opposing pair of adjacent sides. The method also includes obtaining a profile of the image in a circular pattern within a barcode data bearing grid, dividing said profile of a circular pattern into a number of pairs of opposing semi-circular patterns, comparing with each other the profiles of semi-circular patterns to each of said pairs of opposing semi-circular patterns, defining the orientation of the barcode data bearing grid as a function of the orientation of the pair of profiles of semi-circular patterns which have the best match, obtaining a profile of the image along the orientation of the barcode data borne by the barcode data bearing grid, scanning along at least one of the bars and spaces of the barcode data to verify the orientation and confirm that the barcode data bearing grid is a portion of a bona fide barcode, combining into a group, contiguous grids having said defined orientation, examining each neighboring grid to each of the combined contiguous grids to determine its orientation, and adding said neighboring grid to the group if it has the defined orientation.

This invention also features a method of detecting a barcode in an image including capturing an image, examining the image in a plurality of grids, and obtaining a profile of the image along pairs of opposing portions of the edge of a grid. The number of transitions in the profile of each pair of opposing portions is determined. The number of transitions in one portion of a pair of opposing portions is compared with the number of transitions in the opposing portion of that pair of opposing portions. A potential barcode data bearing grid is identified when the count of transitions on one portion of a pair matches the count of transitions on the opposing portion of that pair.

In a preferred embodiment, the edge may include four sides and the number of transitions on each adjacent pair of sides may be compared to the number of transitions on the opposing adjacent pair of sides.

This invention also features a barcode detection system including means for capturing an image, means for examining an image in a plurality of four sided grids, and means for obtaining a profile of the image along each side of a grid. There are means for determining the number transitions in the profile of each side and means for comparing the number of transitions in each adjacent pair of sides with the number of transitions in the opposing adjacent pair of sides respectively. There are means for identifying a potential barcode data bearing grid when the count of transitions on one pair of adjacent sides matches the count of transitions on the opposing pair of adjacent sides.

In a preferred embodiment, there may be means for obtaining a profile of the image in a circular pattern within a barcode data bearing grid and means for dividing the profile of a circular pattern into a number of pairs of opposing semi-circular patterns. There may be means for comparing with each other the profiles of semi-circular patterns to each of the pairs of opposing semi-circular patterns and means for defining the orientation of the barcode data bearing grid as a function of the orientation of the pair of profiles of semi-circular patterns which have the best match. There may be means for obtaining a profile of the image along the orientation of the barcode data borne by the barcode data bearing grid and means for scanning in perpendicular along at least one of the bars and spaces of the barcode data to verify the orientation and confirm that the barcode data bearing grid is a portion of a bona fide barcode. There may be means for combining in a group, contiguous grids having the defined orientation, means for examining each neighboring grid to each of the combined contiguous groups to determine its orientation, and means for adding the neighboring grid to the group if it has the defined orientation. The transition counts may match when the counts are approximately equal or when they are equal. The profile of the image in a circular pattern may be a gray scale profile. The means for comparing with each other the profiles of a circular pattern may includes means for differencing the gray scale values of each pair of opposing pair of semi-circular patterns. The means for scanning may scan along at least one of the bars and space of the barcode data.

This invention also features a barcode detection system including means for capturing an image, means for examining the image in a plurality of four sided grids, means for obtaining a profile of the image along each side of a grid, means for determining the number of transitions in the profile of each side, means for comparing the number of transitions in each adjacent pair of sides with the number of transitions in the opposing adjacent pair of sides, respectively, and means for identifying a potential barcode data bearing grid when the count of transitions on one pair of adjacent sides matches the count of transitions on the opposing pair of adjacent sides. There are also means for obtaining a profile of the image in a circular pattern within a barcode data bearing grid, means for dividing said profile of a circular pattern into a number of pairs of opposing semi-circular patterns, means for comparing with each other the profiles of semi-circular patterns to each of said pairs of opposing semi-circular patterns, and means for defining the orientation of the barcode data bearing grid as a function of the orientation of the pair of profiles of semi-circular patterns which have the best match.

This invention also features a barcode detection system including means for capturing an image, means for examining the image in a plurality of four sided grids, means for obtaining a profile of the image along each side of a grid, means for determining the number of transitions in the profile of each side, means for comparing the number of transitions in each adjacent pair of sides with the number of transitions in the opposing adjacent pair of sides, respectively, and means for identifying a potential barcode data bearing grid when the count of transitions on one pair of adjacent sides matches the count of transitions on the opposing pair of adjacent sides. There are means for obtaining a profile of the image in a circular pattern within a barcode data bearing grid, means for dividing said profile of a circular pattern into a number of pairs of opposing semi-circular patterns, means for comparing with each other the profiles of semi-circular patterns to each of said pairs of opposing semi-circular patterns, means for defining the orientation of the barcode data bearing grid as a function of the orientation of the pair of profiles of semi-circular patterns which have the best match, means for obtaining a profile of the image along the orientation of the barcode data borne by the barcode data bearing grid, and means for scanning along at least one of the bars and spaces of the barcode data to verify the orientation and confirm that the barcode data bearing grid is a portion of a bona fide barcode.

This invention also features a barcode detection system including means for capturing an image, means for examining the image in a plurality of four sided grids, means for obtaining a profile of the image along each side of a grid, means for determining the number of transitions in the profile of each side, means for comparing the number of transitions in each adjacent pair of sides with the number of transitions in the opposing adjacent pair of sides, respectively, and means for identifying a potential barcode data bearing grid when the count of transitions on one pair of adjacent sides matches the count of transitions on the opposing pair of adjacent sides. There are means for obtaining a profile of the image in a circular pattern within a barcode data bearing grid, means for dividing said profile of a circular pattern into a number of pairs of opposing semi-circular patterns, means for comparing with each other the profiles of semi-circular patterns to each of said pairs of opposing semi-circular patterns, and means for defining the orientation of the barcode data bearing grid as a function of the orientation of the pair of profiles of semi-circular patterns which have the best match. There are means for obtaining a profile of the image along the orientation of the barcode data borne by the barcode data bearing grid, and means for scanning along at least one of the bars and spaces of the barcode data to verify the orientation and confirm that the barcode data bearing grid is a portion of a bona fide barcode. There are means for combining into a group, contiguous grids having said defined orientation, means for examining each neighboring grid to each of the combined contiguous grids to determine its orientation, and means for adding said neighboring grid to the group if it has the defined orientation.

This invention also features a barcode detection system including means for capturing an image, means for examining the image in a plurality of grids, and means for obtaining a profile of the image along pairs of opposing portions of the edge of a grid. There are means for determining the number of transitions in the profile of each pair of opposing portions and means for comparing the number of transitions in one portion of a pair of opposing portions with the number of transitions in the opposing pair of opposing portions. There are means for identifying a potential barcode data bearing grid when the count of transitions on one portion of a pair matches the count of transitions on the opposing portion of that pair.

In a preferred embodiment, the edge may include four sides and the number of transitions on each adjacent pair of sides may be compared to the number of transitions on the opposing adjacent pair of sides.

BRIEF DESCRIPTION OF THE DRAWINGS

Other objects, features and advantages will occur to those skilled in the art from the following description of a preferred embodiment and the accompanying drawings, in which:

FIG. 6 illustrates a plot of the circular pattern used in FIG. 5;

DISCLOSURE OF THE PREFERRED EMBODIMENT

Figure 1:
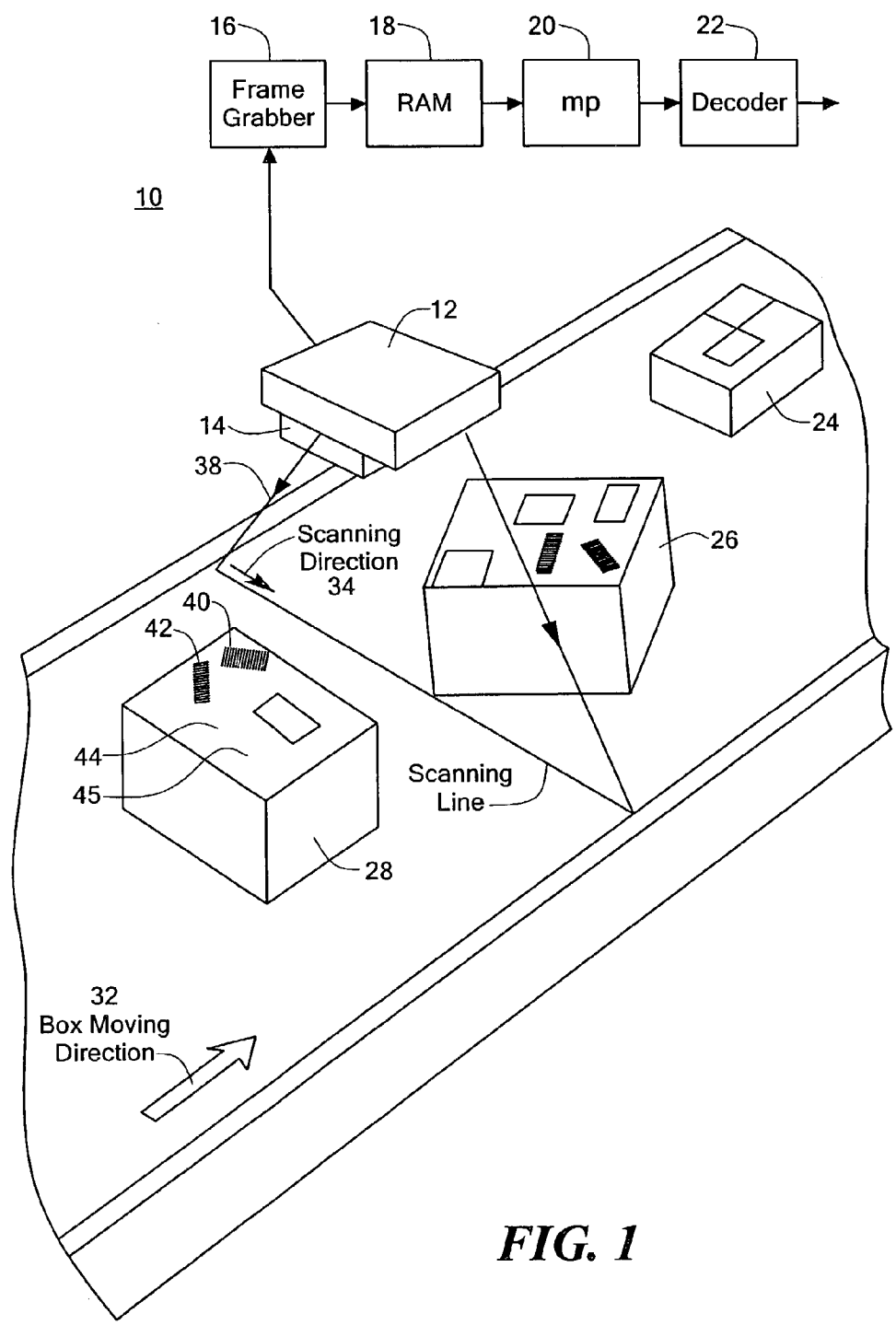
FIG. 1 is a schematic block diagram of a barcode detection system according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 a barcode detection system 10 including camera 12 with optics 14, frame grabber 16, random access memory 18, microprocessor 20, and decoder 22. As packages, such as boxes 24, 26, and 28 are moved along by conveyor 30 in the direction of arrow 32, they are scanned in the direction of arrow 34 along scanning line 36 from optics 14. Each package, as exemplified by box 28, includes on its top 45 one or more barcodes 40, 42 and a variety of extraneous information such as labels, logos, directions 44 which add to and complicate the job of detecting the barcodes themselves. As the box 28 moves along in the direction of arrow 32, and is scanned in the direction of arrow 34, a two dimensional image is constructed which is acquired by frame grabber 16 from camera 12 which is typically an linear CCD camera. The image is buffered in RAM 18 from which the data is operated on by microprocessor 20 which must identify and locate the one or more barcodes 40, 42, determine their orientation and then provide them in the proper form to decoder 22 for interpretation of the data contained in the barcode bars and spaces.

Figure 2:
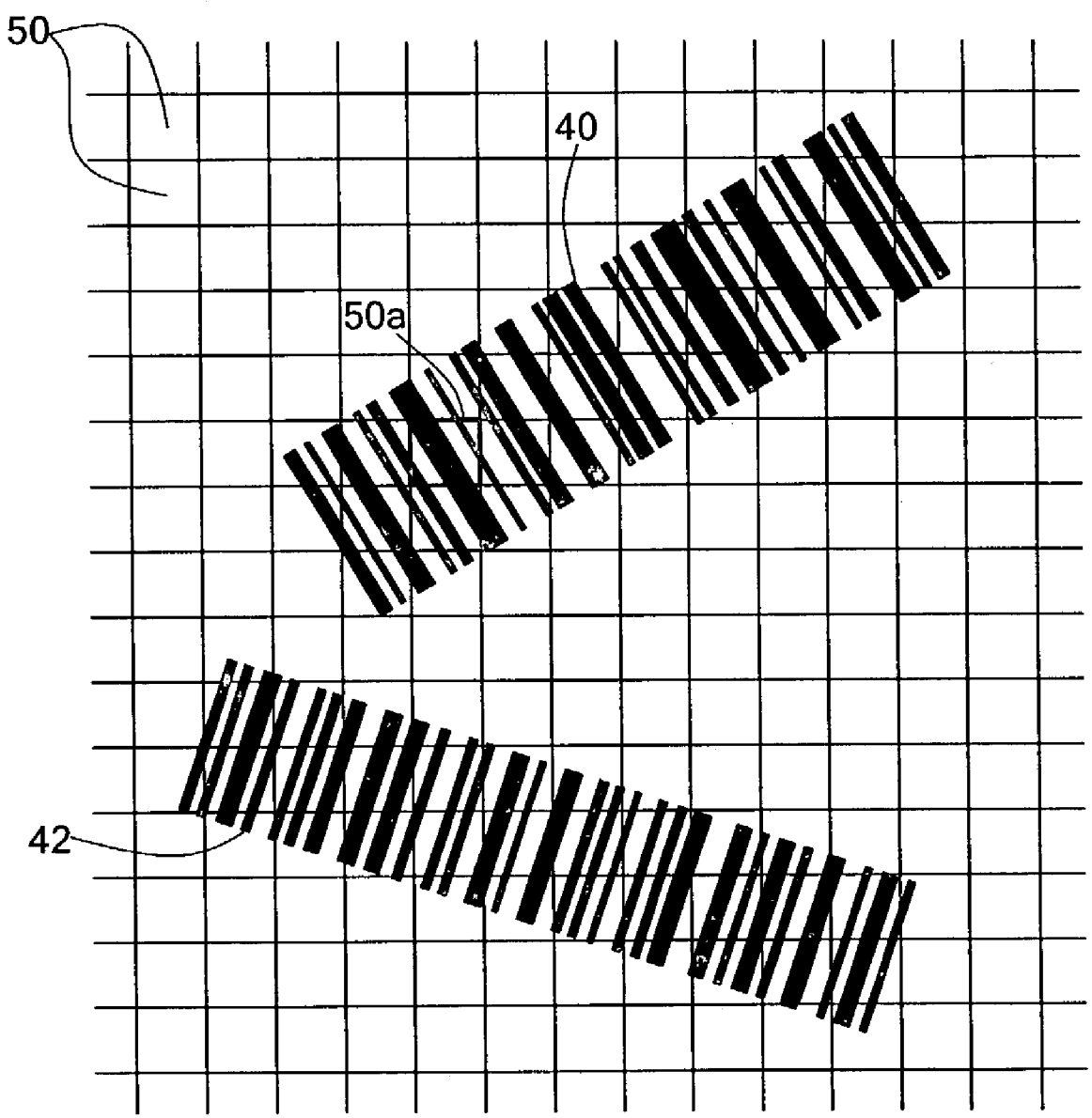
FIG. 2 illustrates a pair of barcode labels examined in a plurality of grids.
Figure 3:
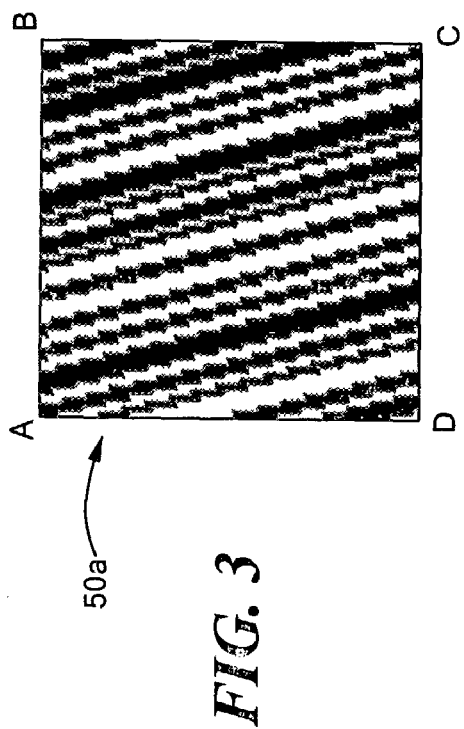
FIG. 3 is an enlarged view of a grid containing barcode data.
Figure 4:
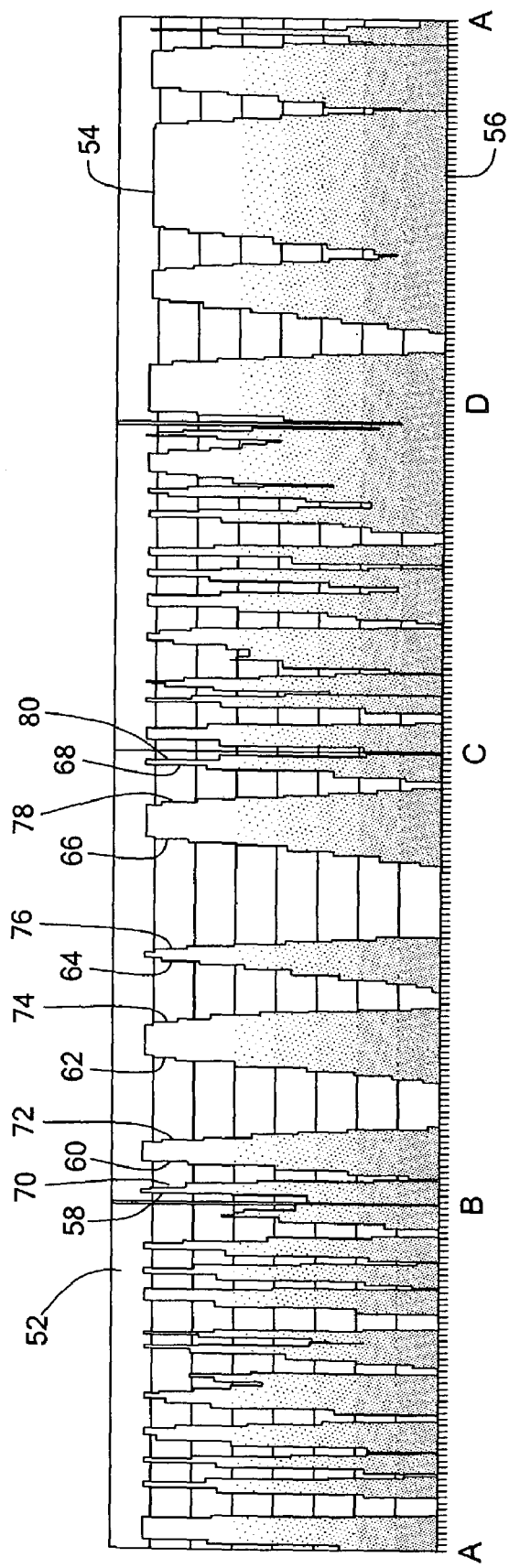
FIG. 4 is an illustration of the gray scale edge profiles of the barcode on the four sides of the edge of the grid in FIG. 3.

In accordance with this invention the entire image including the entire top of the box 28 as well as surrounding portions of conveyor 30 is segmented and examined in a matrix of grids 50, FIG. 2 each of which grids is comprised of a matrix of 64 rows and 64 columns of pixels. Further processing is performed primarily on individual grids, as exemplified by grid 50a, FIG. 3, which is analyzed with respect to its sides. Although grid 50a is shown as a square, this is not a necessary limitation of the invention, although a four sided grid is preferred. A gray scale profile is obtained of each side, A-B, B-C, C-D, and D-A, FIG. 3, and is shown in an expanded view in FIG. 4. The upper portion of the wave forms at 54 represent the white spaces and the lower ends at 56 represent the black or dark bars. The number of bar/space transitions in each side A-B, B-C, C-D, and D-A, are counted. Each positive going or negative going transition counts as 1. For example, on side B-C there are six positive going transitions 58–68 and six negative going transitions, 70–80. These transitions are counted and then accumulated by adjacent pairs and compared. To be specific, the count of transitions on side A-B and B-C are totaled and compared to the count of transitions on side C-D and D-A. Their correspondence is noted. Then the count of transitions on side B-C and C-D is compared to that of D-A and A-B. Their correspondence is noted. If there is a match in either case, this grid is identified as a candidate for containing barcode bearing data. What constitutes a match depends upon the accuracy desired. For example a match could be a few percent or greater or it could be exact equality, depending upon the need. This is a simple and relatively fast technique for determining whether or not a grid is of any further interest, if it is not, it is removed from the decision making process and so dramatically reduces the computing power and time required.

Figure 5:
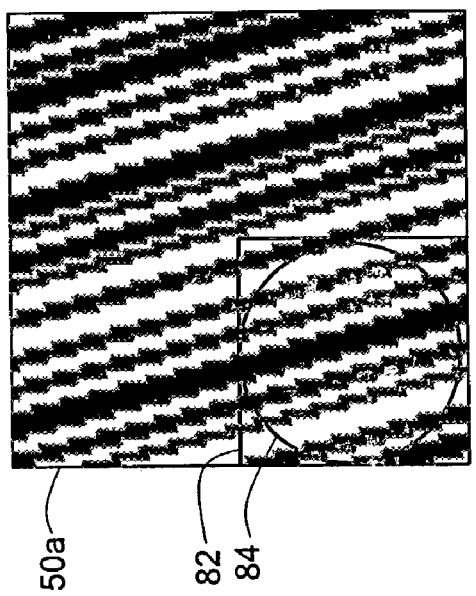
FIG. 5 is an illustration of the location of the edge profile circle for the barcode data.
Figure 7:
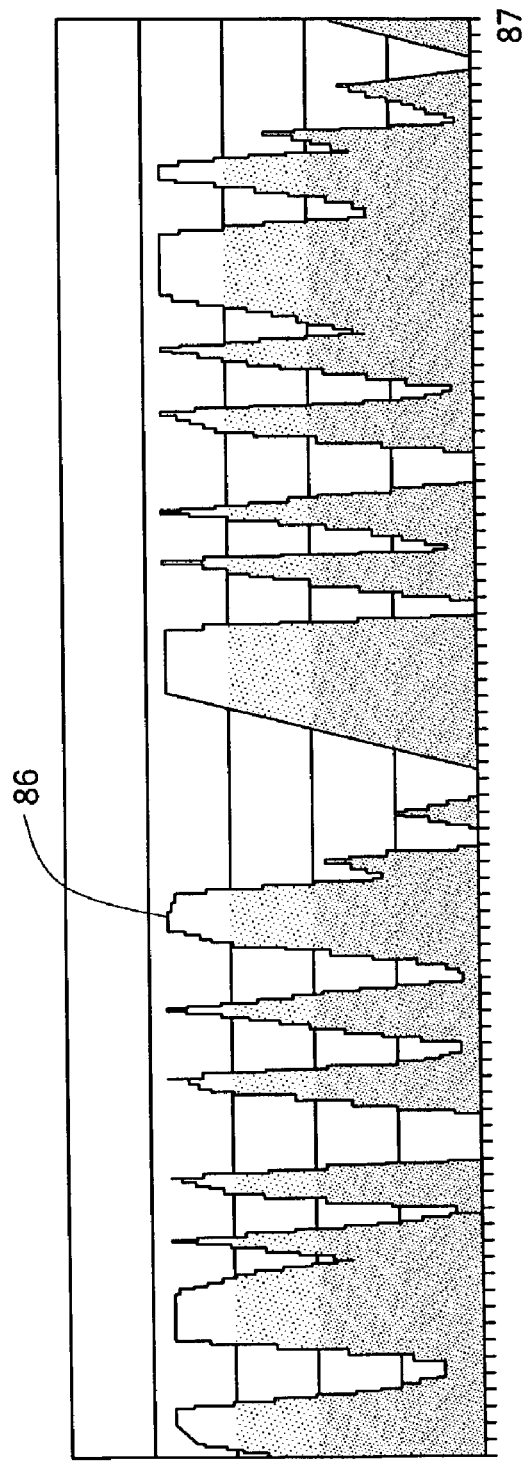
FIG. 7 is an illustration of the gray scale edge profiles of the barcode data on the circular pattern in the section of the grid shown in FIG. 5.
Figure 6:
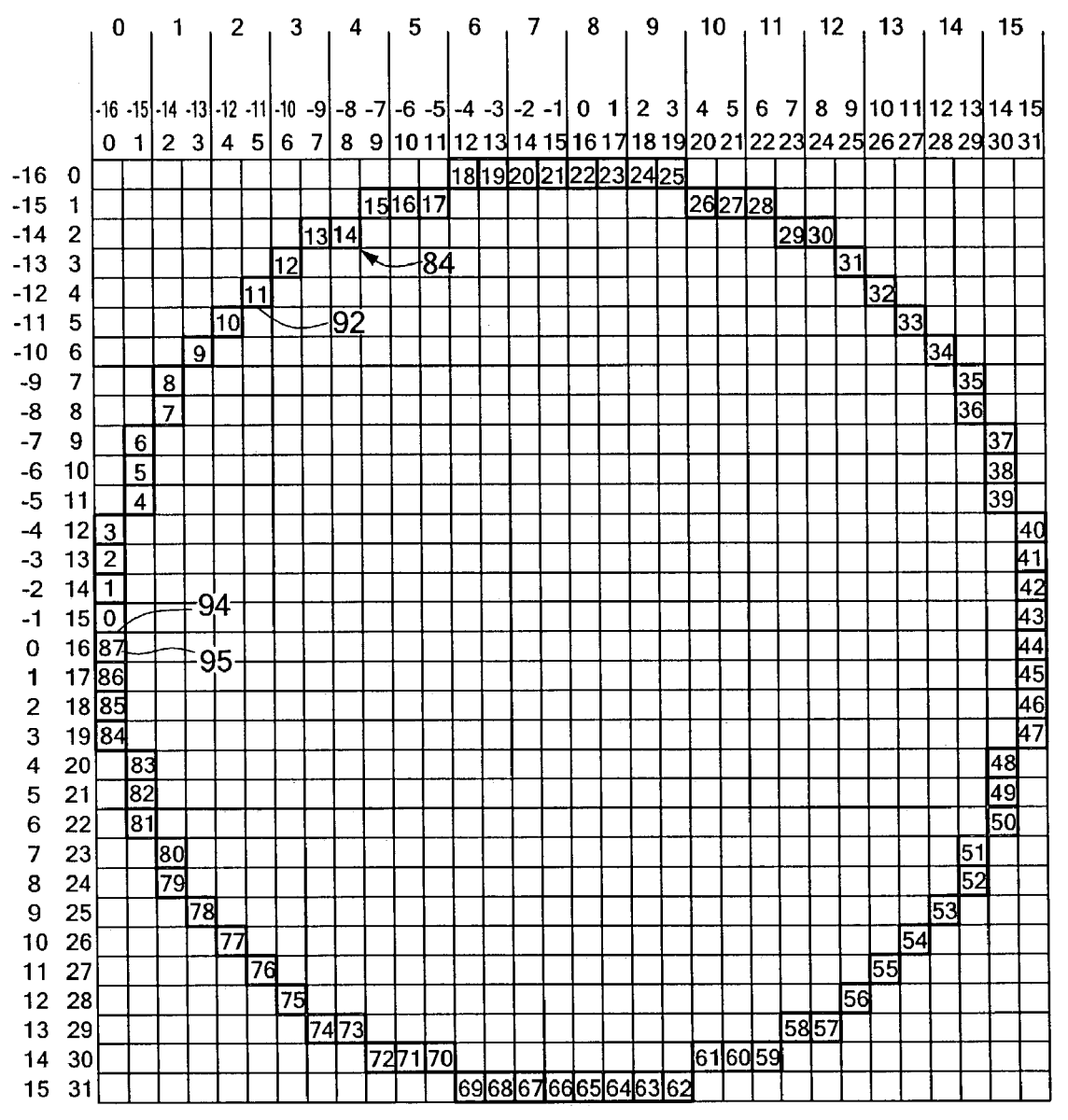
Figure 8:
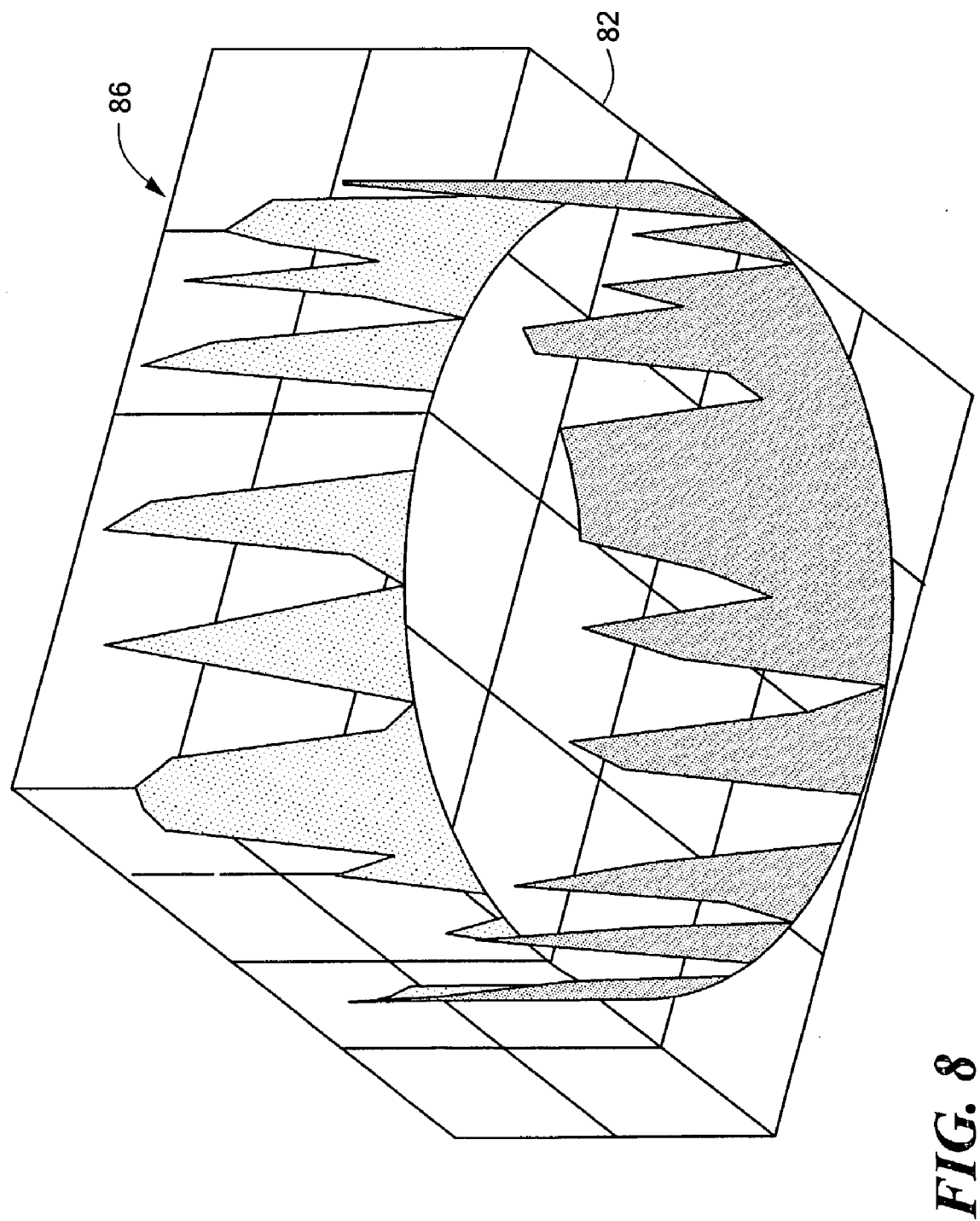
FIG. 8 is a three axes representation of the circular pattern grayscale profile of FIG. 7.

If the indication is affirmative, then the orientation of this potential barcode data bearing grid is investigated. To effect this, a lesser or sub-grid section 82, FIG. 5 of grid 50 is chosen. Typically, the sub-grid section is a quarter of whole grid 50a and is the one that has the most edge transitions along its sides. Quarter grid section 82 would have a size of thirty-two by thirty-two pixels. A circular pattern 84 is imposed within section 82 and a gray scale profile is made of the circumference of circle 84. This gray scale profile 86 is depicted in FIG. 7 for the entire circular path encompassing eighty-eight pixels designated zero through eighty-seven, which make up the circumference of circular pattern 84. The three axis view of profile 86 in FIG. 8 better illustrates the concept wherein the height of the profile 86 in FIGS. 7 and 8 represents the gray scale value of the image at that pixel. A pixel map 90, FIG. 6, shows the circumference 92 of circular pattern 84 as being made up of an array of pixels numbered zero through eighty-seven, beginning with zero at point 94 and ending at point 95 with pixel eighty-seven. To determine the orientation of the bars and spaces of the bar code in accordance with this invention, circular pattern 84 is divided into two semi-circular portions which may be equal or exact semi-circles. For example, assuming the first semi-circle extends from pixel zero through pixel forty-three and the second semi-circle extends from pixel eighty-seven through pixel forty-four. The gray scale values of each pixel of the two opposing semi-circular portions are then compared, for example by differencing. For example, the gray scale value in pixel zero may be subtracted from the gray scale value in pixel eighty-seven. The result of this absolute difference can then have added to it the absolute value between the gray scale value in pixel one and the gray scale value from pixel eighty-six. Then the absolute value between the gray scale value for pixel two and the gray scale value for pixel eighty-five is added to this result. This continues going around the two semi-circular portions until the pixels forty-three and forty-four are reached. The result is stored and then another pair of semicircular portions are chosen for example, the next portion could be simply the portion from pixel one through pixel forty-four and from pixel zero through pixel forty-five. The same differencing is affected and the result again is stored. After the entire sequence, the pair of semi-circular portions that gave the best match by zero sum, or lowest value, for example, would be designated as identifying the true orientation of the barcode bars and spaces. The diameter that splits that pair of opposing semi-circular portions is therefore perpendicular to the direction of the barcode bars and spaces. This simple technique of add and accumulate substantially reduces the amount and time of computing power required and gives highly accurate results as to the orientation of the barcode data. If an even faster processing time is required, fewer pixels or fewer semi-circular opposing portions can be used. For greater accuracy additional pixels could be introduced.

Figure 9:
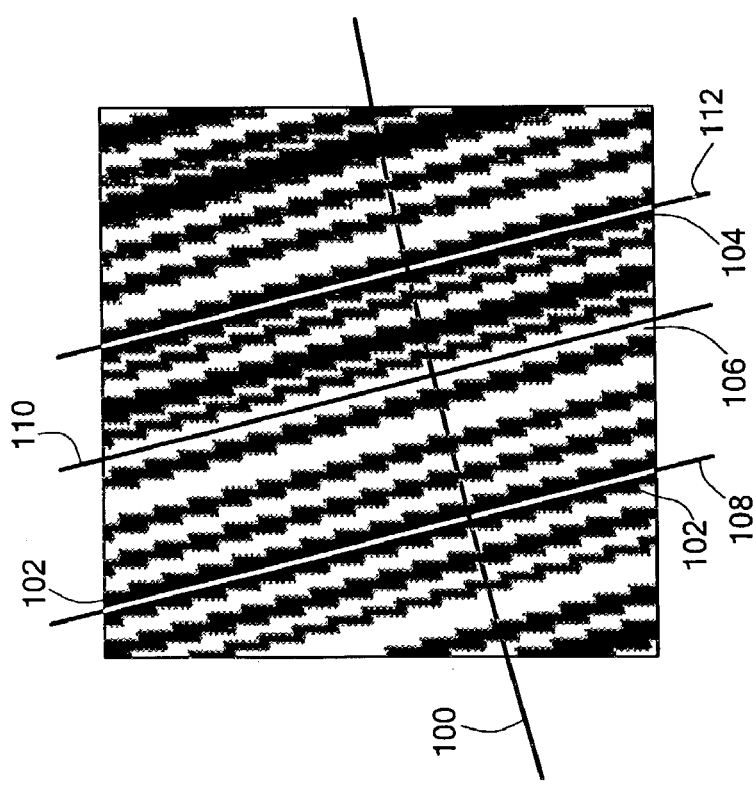
FIG. 9 is a view of the grid of FIG. 3 illustrating scans along the widest bars and spaces to verify the orientation of the barcode in that grid.

Once an orientation has been determined, for example by the diameter line 100, FIG. 9, a verification scan can be made along one or more of the bars and spaces to verify the accuracy of the orientation. Thus, choosing two of the widest black bars 102 and 104, and one of the widest white bars, 106, scans 108, 110 and 112 are made perpendicular to the diameter 100. If the scans 108, 110, and 112 are consistent along the bars 102, 104 and space 106, then the orientation is verified and accepted.

Figure 10:
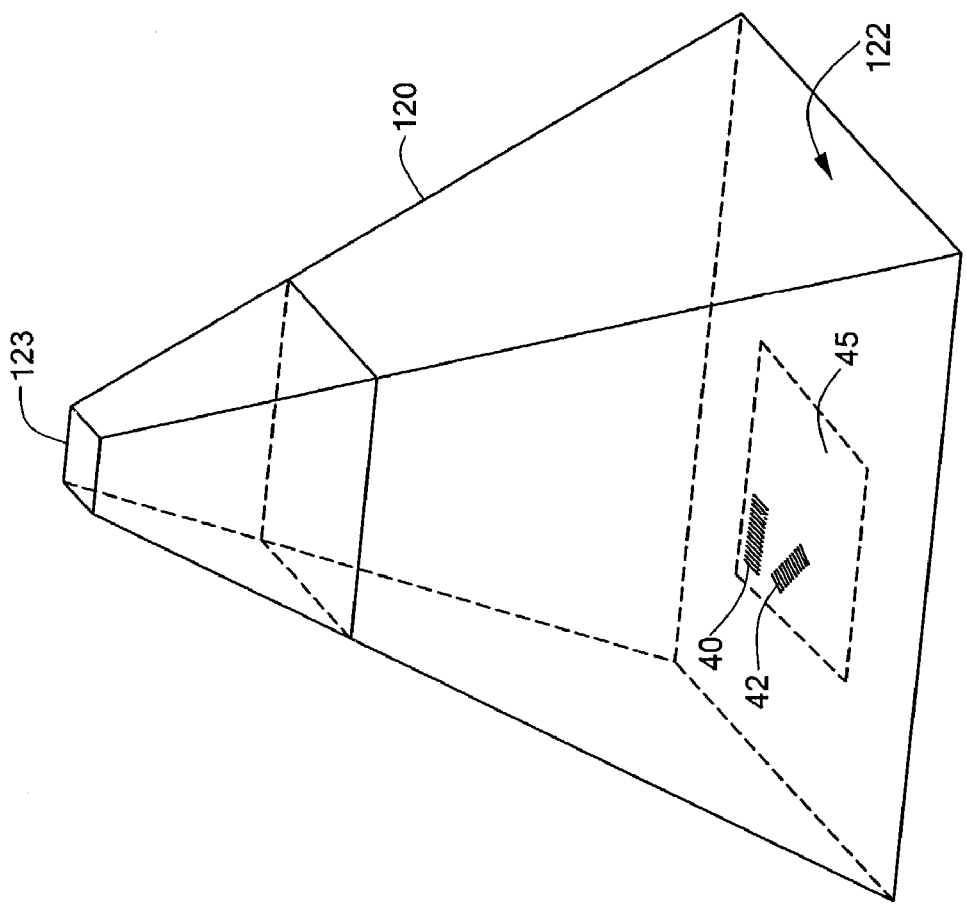
FIG. 10 illustrates a mapping of the orientation data from the grids.
Figure 11:
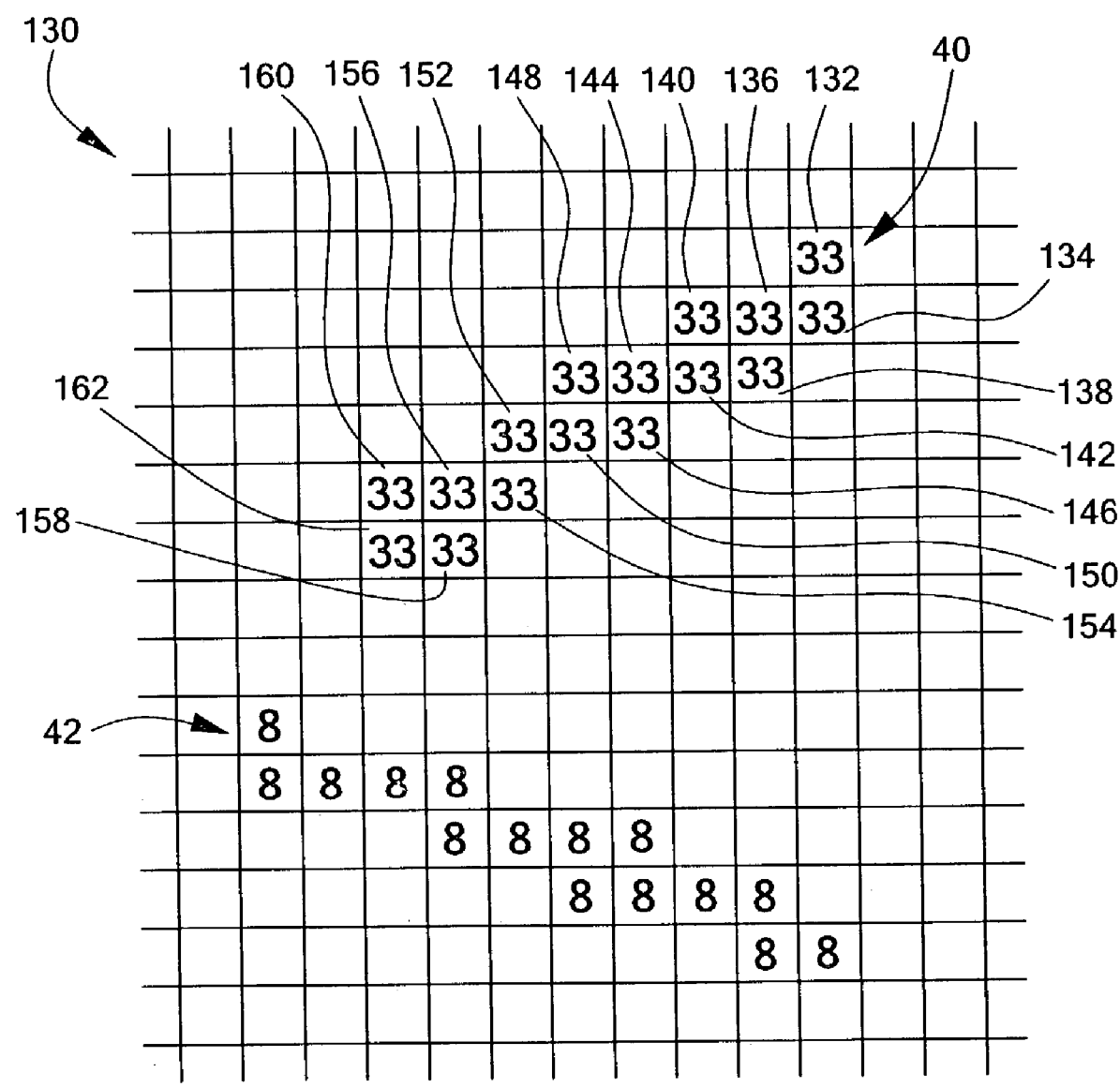
FIG. 11 illustrates the mapping of the orientation data of FIG. 2 indicating barcode data bearing grids onto level 1.
Figure 12:
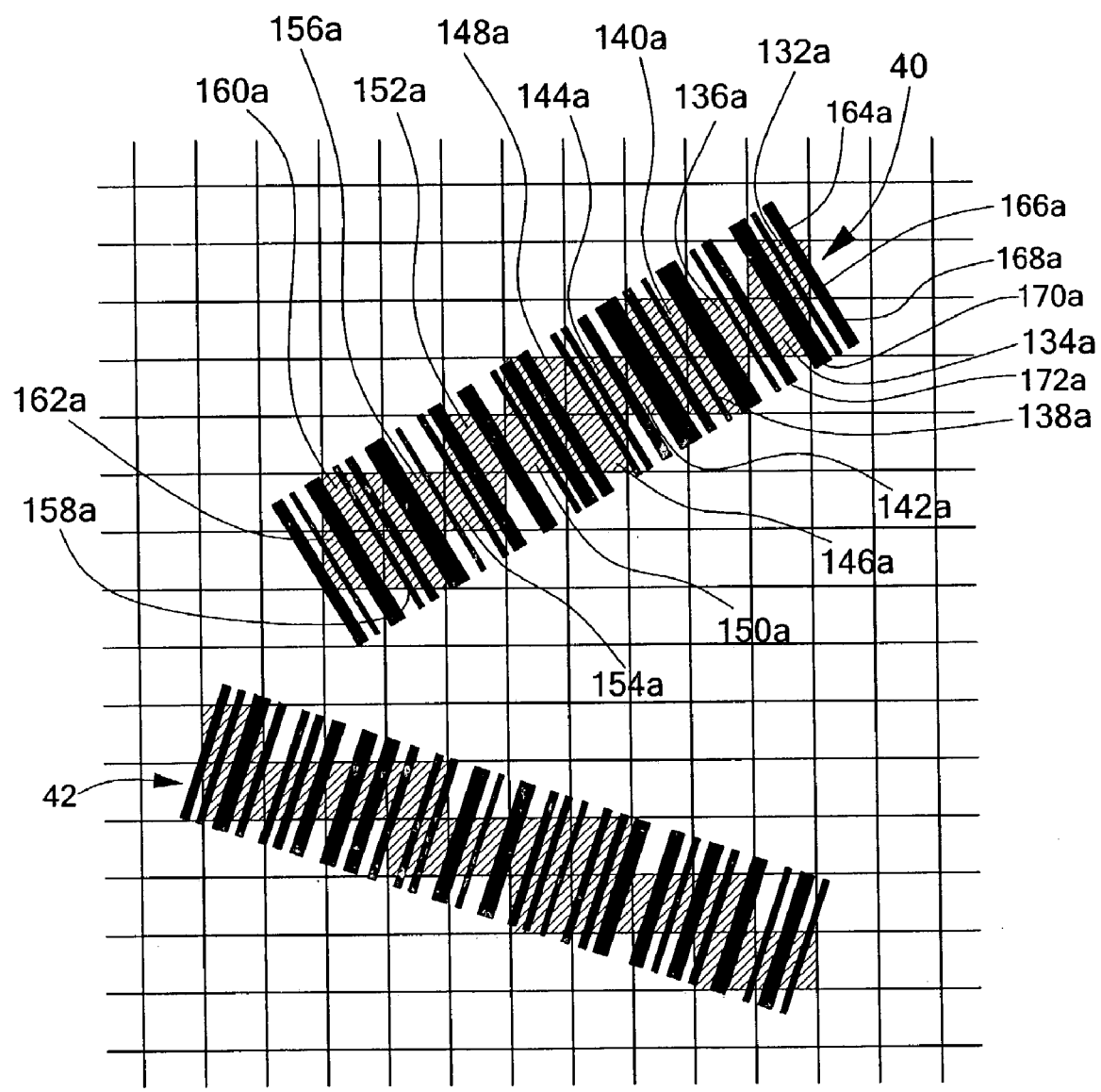
FIG. 12 is a view similar to FIG. 2 showing the originally identified barcode data bearing grids in accordance with the map of FIG. 11.
Figure 13:
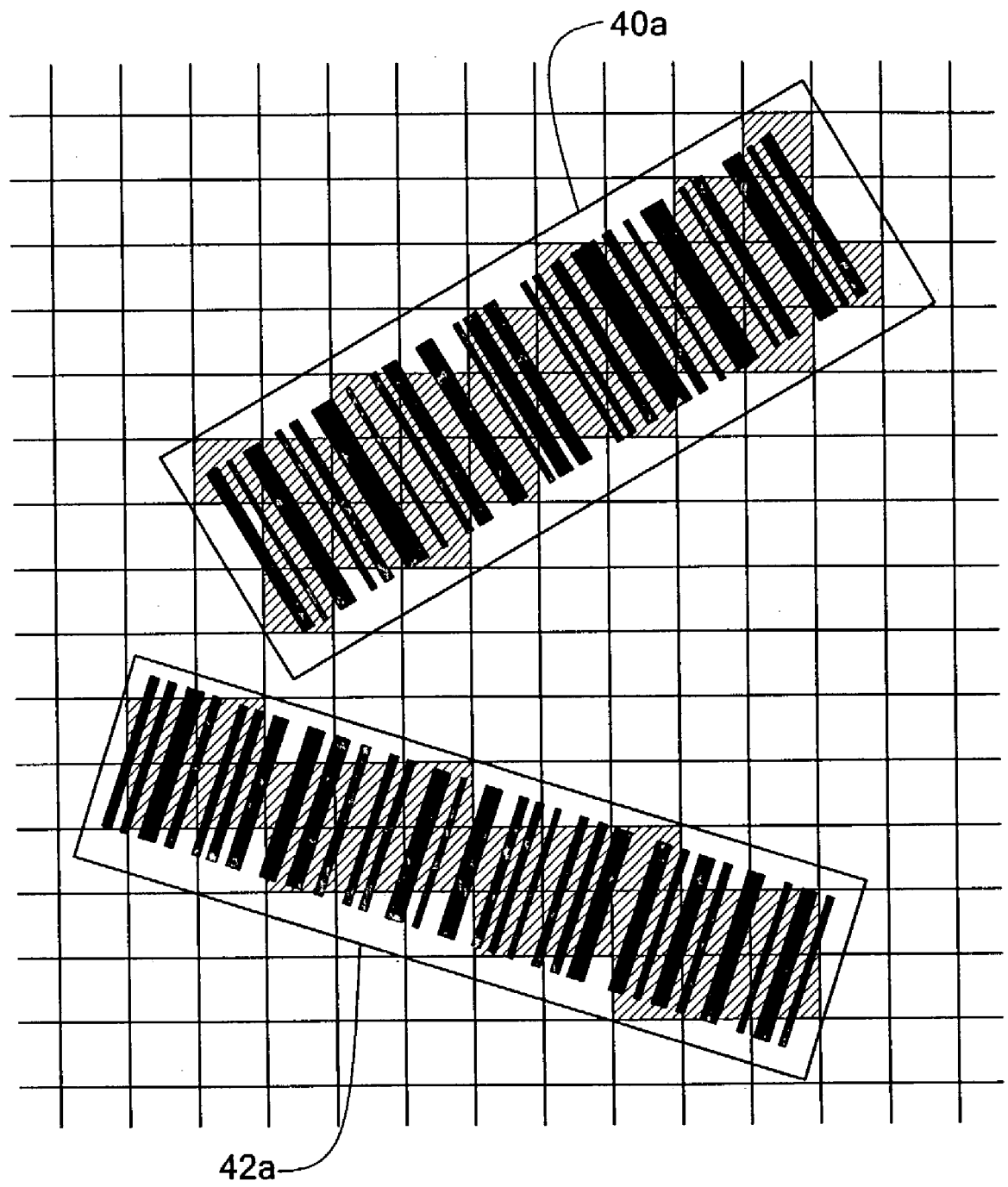
FIG. 13 is a view similar to FIG. 12 showing the barcode after it has grown to include neighboring grids having barcode data oriented as the original barcode data grids.

The grids are now combined to construct an entire barcode label area. In accomplishing this, in accordance with this invention, the data may once again be reduced to decrease the required computing power and time. This is accomplished by assigning each of the sixty-four by sixty-four grids to a single value instead of the four-thousand ninety-six pixel values they normally hold and that one value represents the orientation of the barcode data found in that grid. Thus, as shown by the illustrative truncated pyramid structure 120, FIG. 10, a group of, for example, thirty by thirty grids 122 each of which contains four thousand ninety-six pixel values can be reduced to a thirty by thirty pixel area each of which has but one value in it representing the orientation of the bar code data in it. Map 130 of this is shown in FIG. 11 where grids 132–162 depict the information (33) representing the orientation of the grids of the barcode 40. Similarly, in barcode 42 the information (8) represents the data orientation of the barcode 42. In FIG. 12 grids 132a–162a represent those grids which are clearly bearing barcode data and definitively oriented. Neighboring grids which have only a portion of barcode bars and spaces in them are represented in grids 164a, 166a, 168a, 170a, 172a and so on. These are grids which were not identified to contain barcode like data in them. In order to expand or to "grow" the barcode label to its full area, one more opportunity is taken to look at these grids as potential contributors to the barcode label area. This is done by selecting a known area such as 132a, FIG. 12, and then looking at each neighboring grid in succession to see if it has bar code label data and if it is oriented the same as that in the seed or beginning grid. If it is neighboring a verified grid and even though it is not itself verified, this neighboring grid will be accepted as a part of the barcode label if the bars and spaces in it have the same orientation as the original. It then becomes a seed grid itself and its neighbors are now examined in the same way. This continues around the entire barcode label area through all of the grids 132a–162a and in this way the barcode label area is grown to encompass the larger area as shown at 40a in FIG. 13 a similar process effects the growth of barcode label 42a.

Figure 14:
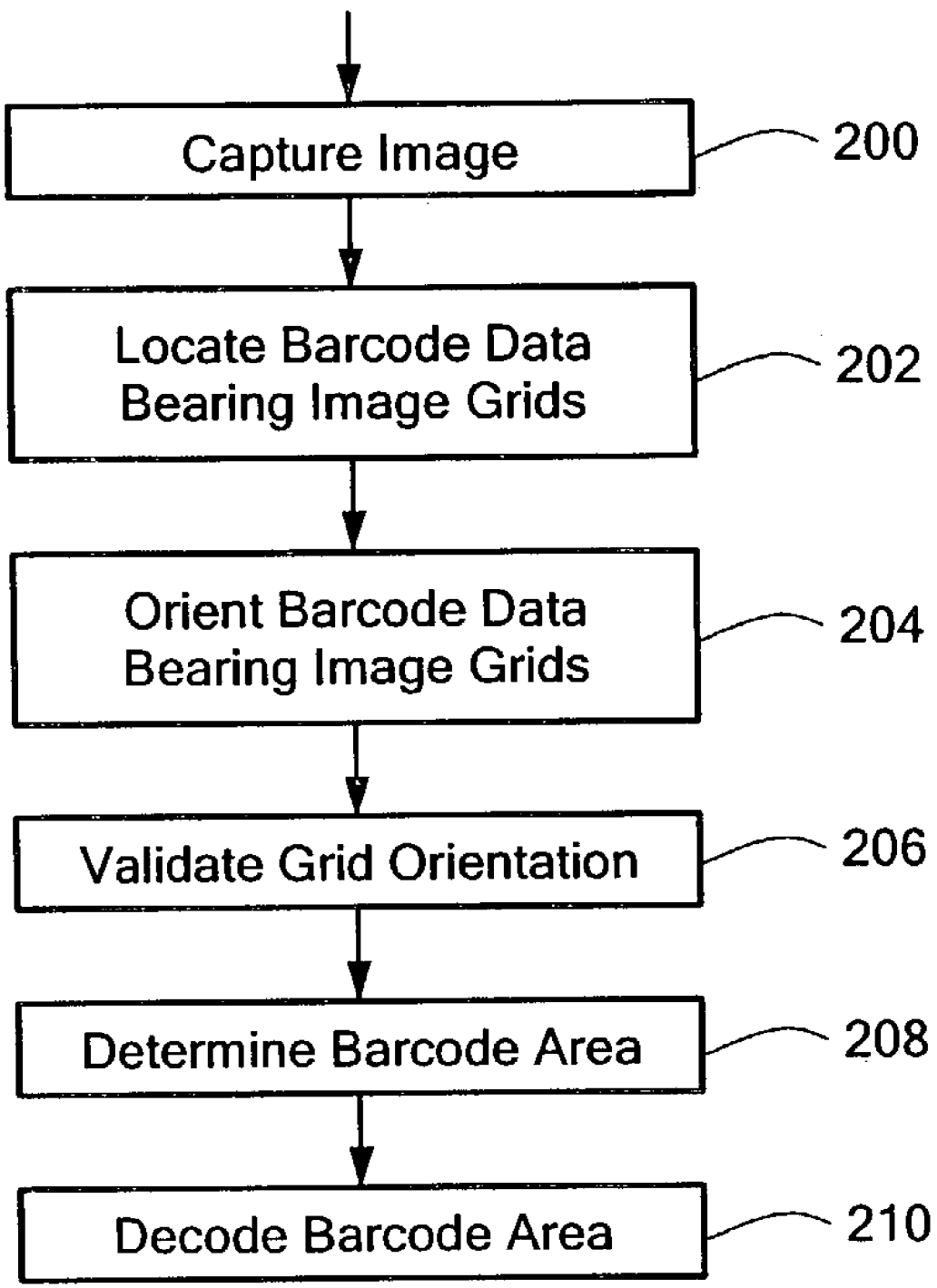
FIG. 14 is a flow chart illustrating the method of this invention.
Figure 15:
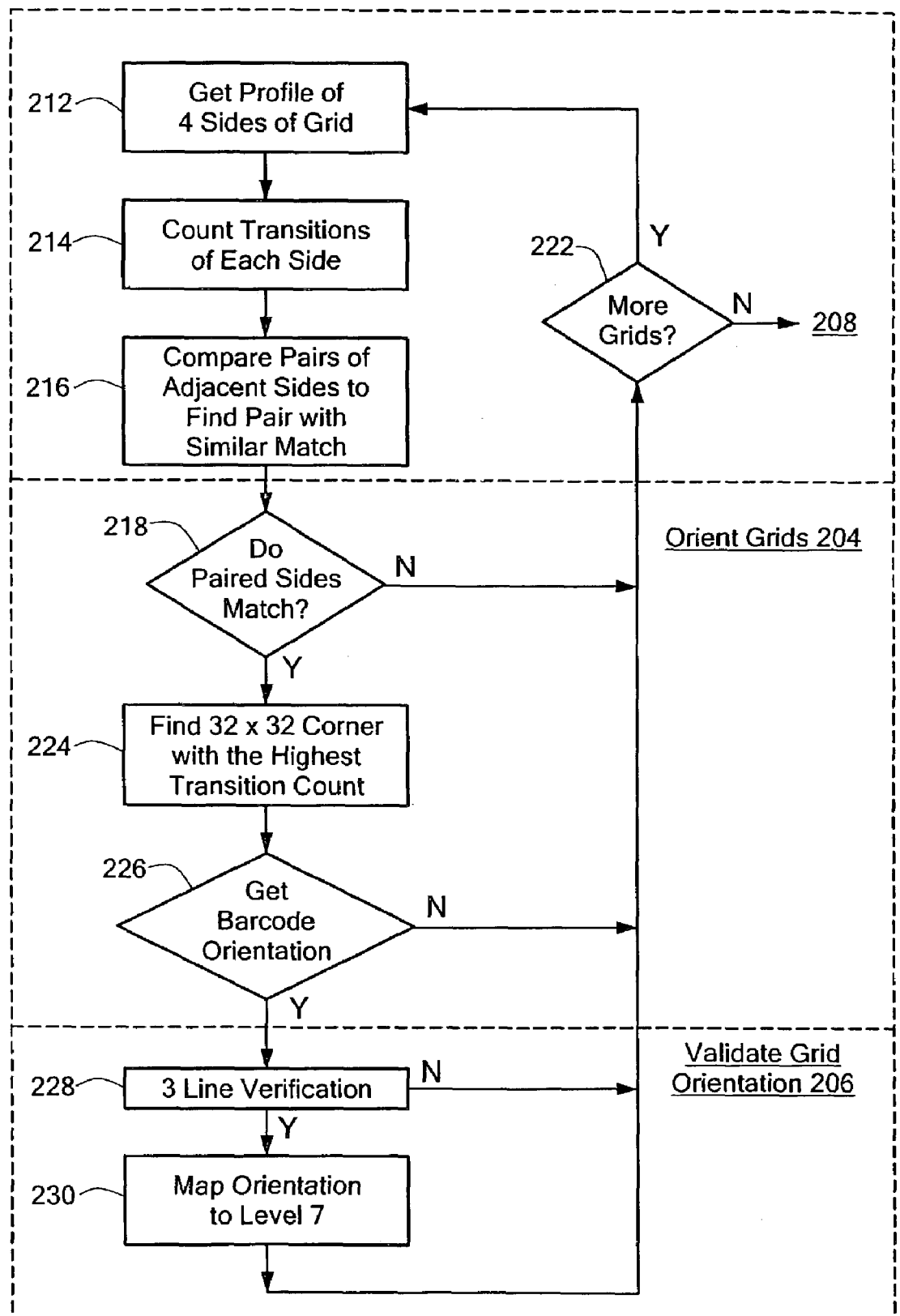
FIG. 15 is a flow chart illustrating in more detail the locating, orienting, and orientation verification routines of FIG. 14.

The method according to this invention includes capturing the image, step 200, FIG. 14, and then locating the barcode data bearing grids, step 202. In this step all of those grids which contain no barcode data are eliminated from further processing thereby reducing the time and computing load on the system. Those grids that are found to contain barcode data then have their orientation determined in step 204. The orientation of the barcode data in that grid is validated, step 206 and then the grids are combined to determine the entire barcode area step 208, after which the barcode area is decoded in step 210. The routine of locating the barcode data bearing image grids 202 is shown in greater detail in FIG. 15 where in step 212 the profile is obtained of four sides of the grid. Then, in step 214, the bar/space transitions are counted on each side of the grid. In step 216 the count of the bar/space transitions in pairs of adjacent sides are compared to see of there is a match.

Figure 16:
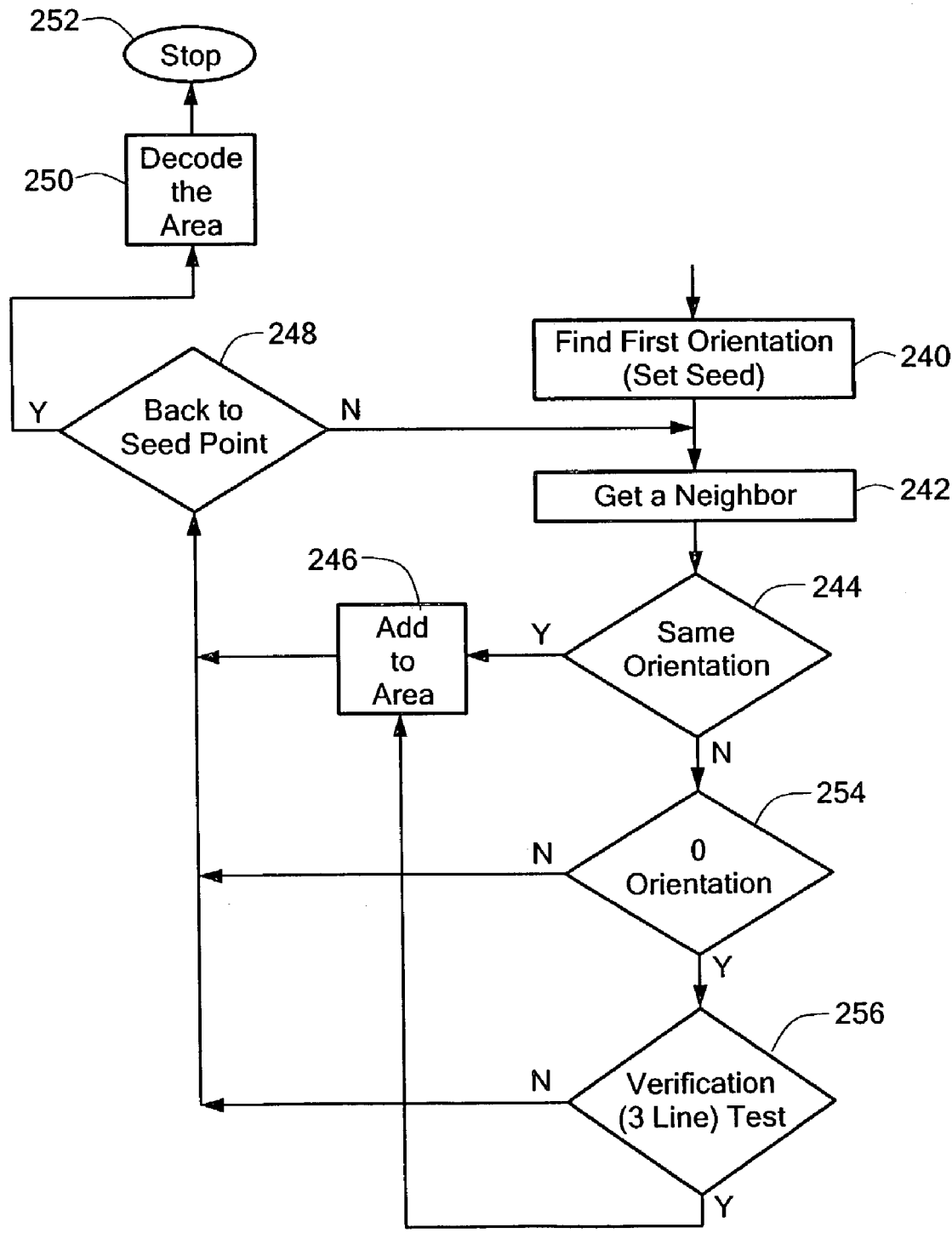
FIG. 16 is a flow chart illustrating in more detail the determination of the barcode area.

Processing then proceeds to the next routine 204 in which the orientation of the grid is determined. There, if two opposing/adjacent sides match, in step 218, a smaller portion of the grid typically a quarter of the sixty-four by sixty-four grid in one corner forming a thirty-two by thirty-two subgrid is chosen which has the highest bar/space transition count of the four quarters in the four corners. A circular pattern of pixels is examined and their gray scale values are differenced to obtain the orientation in step 226. If in step 218 there is no match between adjacent pairs of sides, the system looks for the next grid in step 222. If there are more grids in step 222, the system returns again to get a profile of four sides of a grid in step 212. If there are no more grids, the system exits to determine the barcode area in step 208. The system returns to look for the next grid in step 220 if the orientation can not be determined in step 226. Provided that orientation can be obtained in step 226 the system moves on to the validating grid orientation routine 206 which does a three line verification in step 228 and then moves on to map that orientation to a data reduction form in step 230 and after that returns again to look for the next grid in step 220. When the operation routines 202, 204, and 206 have completed their course, the system moves on to step 208 to determine the barcode area. A first orientation or seed is found in step 240, FIG. 16. This step chooses a grid which has been identified as barcode data bearing and having a clear orientation. After this, a neighboring grid is viewed in step 242. If it has the same orientation in step 244 it is added to the area in step 246. Then if the system is back at the initial seed point the area is decoded in step 250 and the operation stops as it has been completed. If the system is not back at the seed point step 248, the system selects another neighbor in step 242. If the orientation is not the same as determined in step 244, then an inquiry is made in step 254 as to whether the orientation is zero. If it is not zero the system returns to check for the seed point in step 248. If it is a zero orientation, one more opportunity is given to the grid to qualify under the verification three line test. If it qualifies it is then added to the area in step 246, if it does not, the system returns to check for the seed point in step 248.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A method of detecting a barcode in an image comprising:
   capturing an image;
   examining the image in a plurality of four sided grids;
   obtaining a profile of the image along each side of a grid;
   determining the number of transitions in the profile of each side;
   comparing the number of transitions on each adjacent pair of sides with the number of transitions on the opposing adjacent pair of sides, respectively; and
   identifying a potential barcode data bearing grid when the count of transitions on one pair of adjacent sides matches the count of transitions on the opposing pair of adjacent sides.

2. The method of claim 1 further including,
   obtaining a profile of the image in a circular pattern within a barcode data bearing grid;
   dividing said profile of a circular pattern into a number of pairs of opposing semi-circular patterns;
   comparing with each other the profiles of semi-circular patterns to each of said pairs of opposing semi-circular patterns; and
   defining the orientation of the barcode data bearing grid as a function of the orientation of the pair of profiles of semi-circular patterns which have the best match.

3. The method of claim 1 further including,
   obtaining a profile of the image along the orientation of the barcode data borne by the barcode data bearing grid; and scanning along at least one of the bars and spaces of the barcode data to verify the orientation and confirm that the barcode data bearing grid is a portion of a bona fide barcode.

4. The method of claim 1 further including,
combining into a group, contiguous grids having orientation defined as a function of the orientation of the pair profiles of semi-circular patterns which have the best match;
examining each neighboring grid to each of the combined contiguous grids to determine its orientation; and
adding said neighboring grid to the group if it has the defined orientation.

5. The method of claim 1 in which transition counts match when the counts are approximately equal.

6. The method of claim 1 in which the transition counts match when the counts are equal.

7. The method of claim 2 in which said profile of the image in a circular pattern is a gray scale profile.

8. The method of claim 7 in which comparing with each other the profiles in a circular pattern includes differencing the gray scale values of each pair of opposing semi-circular patterns.

9. The method of claim 3 in which scanning scans along the bars and spaces of the barcode data.

10. The method of claim 2 in which the profile of the image in a circular pattern is obtained in a section of the grid which has the highest transition count.

11. A method of detecting a barcode in an image comprising:
capturing an image;
examining the image in a plurality of four sided grids;
obtaining a profile of the image along each side of a grid;
determining the number of transitions in the profile of each side;
comparing the number of transitions on each adjacent pair of sides with the number of transitions on the opposing adjacent pair of sides, respectively;
identifying a potential barcode data bearing grid when the count of transitions on one pair of adjacent sides matches the count of transitions on the opposing pair of adjacent sides;
obtaining a profile of the image in a circular pattern within a barcode data bearing grid;
dividing said profile of a circular pattern into a number of pairs of opposing semi-circular patterns;
comparing with each other the profiles of semi-circular patterns to each of said pairs of opposing semi-circular patterns; and
defining the orientation of the barcode data bearing grid as a function of the orientation of the pair of profiles of semi-circular patterns which have the best match.

12. A method of detecting a barcode in an image comprising:
capturing an image;
examining the image in a plurality of four sided grids;
obtaining a profile of the image along each side of a grid;
determining the number of transitions in the profile of each side;
comparing the number of transitions on each adjacent pair of sides with the number of transitions on the opposing adjacent pair of sides, respectively;
identifying a potential barcode data bearing grid when the count of transitions on one pair of adjacent sides matches the count of transitions on the opposing pair of adjacent sides;

obtaining a profile of the image in a circular pattern within a barcode data bearing grid;
dividing said profile of a circular pattern into a number of pairs of opposing semi-circular patterns;
comparing with each other the profiles of semi-circular patterns to each of said pairs of opposing semi-circular patterns;
defining the orientation of the barcode data bearing grid as a function of the orientation of the pair of profiles of semi-circular patterns which have the best match;
obtaining a profile of the image along the orientation of the barcode data borne by the barcode data bearing grid; and
scanning along at least one of the bars and spaces of the barcode data to verify the orientation and confirm that the barcode data bearing grid is a portion of a bona fide barcode.

13. A method of detecting a barcode in an image comprising:
capturing an image;
examining the image in a plurality of four sided grids;
obtaining a profile of the image along each side of a grid;
determining the number of transitions in the profile of each side;
comparing the number of transitions on each adjacent pair of sides with the number of transitions on the opposing adjacent pair of sides, respectively;
identifying a potential barcode data bearing grid when the count of transitions on one pair of adjacent sides matches the count of transitions on the opposing pair of adjacent sides;
obtaining a profile of the image in a circular pattern within a barcode data bearing grid;
dividing said profile of a circular pattern into a number of pairs of opposing semi-circular patterns;
comparing with each other the profiles of semi-circular patterns to each of said pairs of opposing semi-circular patterns;
defining the orientation of the barcode data bearing grid as a function of the orientation of the pair of profiles of semi-circular patterns which have the best match;
obtaining a profile of the image along the orientation of the barcode data borne by the barcode data bearing grid;
scanning along at least one of the bars and spaces of the barcode data to verify the orientation and confirm that the barcode data bearing grid is a portion of a bona fide barcode;
combining into a group, contiguous grids having said defined orientation;
examining each neighboring grid to each of the combined contiguous grids to determine its orientation; and
adding said neighboring grid to the group if it has the defined orientation.

14. A method of detecting a barcode in an image comprising:
capturing an image;
examining the image in a plurality of grids;
obtaining a profile of the image along pairs of opposing portions of the edge of a grid;
determining the number of transitions in the profile of each portion of each pair of opposing portions;
comparing the number of transitions in one portion of each pair of opposing portions with the number of transitions in the opposing portion of that pair of opposing portions; and identifying a potential barcode data bearing grid when the count of transitions in one portion of a pair matches the count of transitions in the opposing portion of that pair.

15. The method of claim 14 in which said edge includes four sides and the number of transitions on each adjacent pair of sides is compared to the number of transitions on the opposing adjacent pair of sides.

16. A barcode detection system comprising:
means for capturing an image;
means for examining an image in a plurality of four sided grids;
means for obtaining a profile of the image along each side of a grid;
means for determining the number of transitions in the profile of each side;
means for comparing the number of transitions in each adjacent pair of sides with the number of transitions in the opposing adjacent pair of sides, respectively; and
means for identifying a potential barcode data bearing grid when the count of transitions on one pair of adjacent sides matches the count of transitions on the opposing pair of adjacent sides.

17. The system of claim 16 further including,
means for obtaining a profile of the image in a circular pattern within a barcode data bearing grid;
means for dividing said profile of a circular pattern into a number of pairs of opposing semi-circular patterns;
means for comparing with each other the profiles of semi-circular patterns to each of said pairs of opposing semi-circular patterns; and
means for defining the orientation of the barcode data bearing grid as a function of the orientation of the pair of profiles of semi-circular patterns which have the best match.

18. The system of claim 16 further including,
means for obtaining a profile of the image along the orientation of the barcode data borne by the barcode data bearing grid; and
means for scanning along at least one of the bars and spaces of the barcode data to verify the orientation and confirm that the barcode data bearing grid is a portion of a bona fide barcode.

19. The system of claim 16 further including,
means for combining into a group, contiguous grids having orientation defined as a function of the orientation of the pair of profiles of semi-circular patterns which have the best match;
means for examining each neighboring grid to each of the combined contiguous grids to determine its orientation; and
means for adding said neighboring grid to the group if it has the defined orientation.

20. The system of claim 16 in which transition counts match when the counts are approximately equal.

21. The system of claim 16 in which the transition counts match when the counts are equal.

22. The system of claim 17 in which said profile of the image in a circular pattern is a gray scale profile.

23. The system of claim 22 in which said means for comparing with each other the profiles of a circular pattern includes means for differencing the gray scale values of each pair of opposing semi-circular patterns.

24. The system of claim 18 in which said means for scanning scans along the bars and spaces of the barcode data.

25. A method of detecting a barcode in an image comprising:
means for capturing an image;
means for examining the image in a plurality of four sided grids;
means for obtaining a profile of the image along each side of a grid;
means for determining the number of transitions in the profile of each side;
means for comparing the number of transitions in each adjacent pair of sides with the number of transitions in the opposing adjacent pair of sides, respectively;
means for identifying a potential barcode data bearing grid when the count of transitions on one pair of adjacent sides matches the count of transitions on the opposing pair of adjacent sides;
means for obtaining a profile of the image in a circular pattern within a barcode data bearing grid;
means for dividing said profile of a circular pattern into a number of pairs of opposing semi-circular patterns;
means for comparing with each other the profiles of semi-circular patterns to each of said pairs of opposing semi-circular patterns; and
means for defining the orientation of the barcode data bearing grid as a function of the orientation of the pair of profiles of semi-circular patterns which have the best match.

26. A barcode detection system comprising:
means for capturing an image;
means for examining the image in a plurality of four sided grids;
means for obtaining a profile of the image along each side of a grid;
means for determining the number of transitions in the profile of each side;
means for comparing the number of transitions in each adjacent pair of sides with the number of transitions in the opposing adjacent pair of sides, respectively;
means for identifying a potential barcode data bearing grid when the count of transitions on one pair of adjacent sides matches the count of transitions on the opposing pair of adjacent sides;
means for obtaining a profile of the image in a circular pattern within a barcode data bearing grid;
means for dividing said profile of a circular pattern into a number of pairs of opposing semi-circular patterns;
means for comparing with each other the profiles of semi-circular patterns to each of said pairs of opposing semi-circular patterns;
means for defining the orientation of the barcode data bearing grid as a function of the orientation of the pair of profiles of semi-circular patterns which have the best match;
means for obtaining a profile of the image along the orientation of the barcode data borne by the barcode data bearing grid; and
means for scanning along at least one of the bars and spaces of the barcode data to verify the orientation and confirm that the barcode data bearing grid is a portion of a bona fide barcode.

27. A barcode detection system comprising:
means for capturing an image;
means for examining the image in a plurality of four sided grids;
means for obtaining a profile of the image along each side of a grid;
means for determining the number of transitions in the profile of each side;

means for comparing the number of transitions on each adjacent pair of sides with the number of transitions on the opposing adjacent pair of sides, respectively;

means for identifying a potential barcode data bearing grid when the count of transitions on one pair of adjacent sides matches the count of transitions on the opposing pair of adjacent sides;

means for obtaining a profile of the image in a circular pattern within a barcode data bearing grid;

means for dividing said profile of a circular pattern into a number of pairs of opposing semi-circular patterns;

means for comparing with each other the profiles of semi-circular patterns to each of said pairs of opposing semi-circular patterns;

means for defining the orientation of the barcode data bearing grid as a function of the orientation of the pair of profiles in semi-circular patterns which have the best match;

means for obtaining a profile of the image along the orientation of the barcode data borne by the barcode data bearing grid;

means for scanning along at least one of the bars and spaces of the barcode data to verify the orientation and confirm that the barcode data bearing grid is a portion of a bona fide barcode;

means for combining into a group contiguous grids having said defined orientation;

means for examining each neighboring grid to each of the combined contiguous grids to determine its orientation; and means for adding said neighboring grid to the group if it has the defined orientation.

28. A barcode detection system comprising:

capturing an image;

examining the image in a plurality of four sided grids;

obtaining a profile of the image along each side of a grid;

determining the number of transitions in the profile of each side;

comparing the number of transitions in each adjacent pair of sides with the number of transitions in the opposing adjacent pair of sides, respectively;

identifying a potential barcode data bearing grid when the count of transitions on one portion of a pair matches the count of transitions on the opposing pair of adjacent sides.

29. The system of claim 28 in which said edge includes four sides and the number of transitions on each adjacent pair of sides is compared to the number of transitions on the opposing adjacent pair of sides.

* * * * *